Feb. 1, 1927.

J. J. THACHER 1,616,153

AUTOMATIC LATHE

Filed May 31, 1923

INVENTOR.
J. J. Thacher
BY
ATTORNEY.

Patented Feb. 1, 1927.

1,616,153

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

AUTOMATIC LATHE.

Application filed May 31, 1923. Serial No. 642,602.

This invention relates to lathes and particularly to mechanism cooperating therewith for accurately locating a work blank relative to a tool whereby the tool may operate thereon to finish one extremity of the blank, irrespective of considerable variation in the length of the blank. In accordance with the invention, the headstock spindle of the lathe is provided with a spring pressed work engaging center adapted to cooperate with a center mounted rigidly in the tailstock spindle for supporting a work blank therebetween. The tailstock spindle is slidable longitudinally and a stop is mounted on the tailstock for limiting the forward movement of the spindle therein. The work blank is adapted to be driven by a driver on the headstock spindle and means is provided for clamping the tailstock spindle in its work engaging position after the same has engaged the stop. As illustrated in the drawing, mechanism is provided for automatically operating the various parts of the machine, including the tool for cutting the blank. The blank illustrated is a bolt, the head end of which is to be necked and finished. The tool is set in a definite position relative to the tailstock spindle stop whereby the bolt head of the work blank is always located directly in cutting alignment with the tool. The object of the invention is to provide a mechanism of the above type for performing the function stated.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing.

Figure 1:
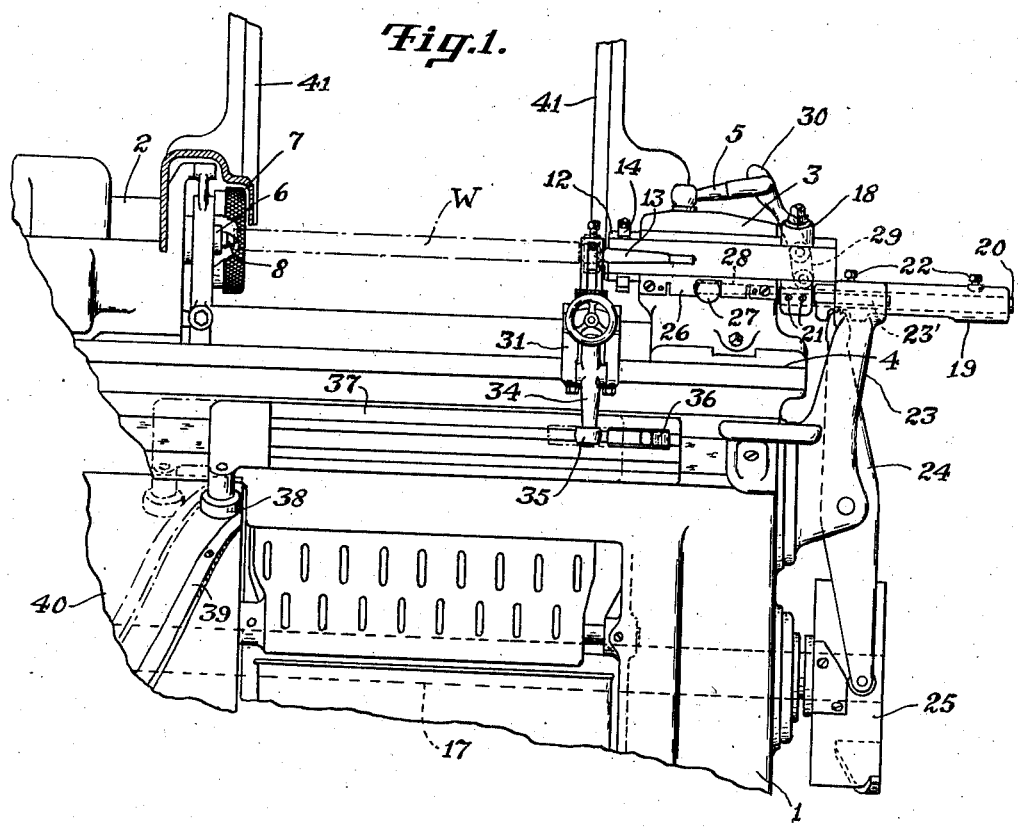
Figure 1 is a partial front elevation of a lathe embodying my invention.

In the drawing, 1 indicates the bed of a lathe having a headstock 2 and a tailstock 3 thereon, the tailstock being adjustably secured to the ways 4 of the bed by means of a handle 5. A spindle 6 is rotatably mounted in the headstock and carries a driver 7 thereon for engaging and rotating the work blank W. A work engaging center 8 is slidably mounted in a bushing 9 in the spindle. A spring 10 normally forces the center forwardly toward the work piece, a stop collar 11 being adapted to limit such forward movement.

A spindle 12 is slidably mounted in the tailstock and carries a cooperating work engaging center 13 therein. This spindle carries a collar 14 which limits the backward movement of the spindle by engaging the tailstock and limits the forward movement thereof by engaging a stop 15 secured to the tailstock by means of a bolt 16.

The spindle 12 is reciprocated from a main driving shaft 17 through the following mechanism: A collar 18 is frictionally secured to the spindle and is operatively connected to an elongated tubular element 19 by means of a rod 20, the rod being secured to the collar by pins 21 and to the element by set screws 22. A guideway 23' for supporting the element 19 is provided in the upper ends of a pair of arms 23 secured to the bed. A lever 24 is pivoted between these arms. The upper end of this lever is connected to the element 19 and a roller on the lower end thereof is adapted to be engaged by cam strips on a drum 25 secured to the shaft 17. The element 19 will therefore be reciprocated when the shaft is rotated.

Extending along the lower edge of the spindle 12 is a plate 26 having a transversely extending bolt 27 seated in a notch therein. A rearwardly extending arm 28 is secured to the bolt. Pivotally mounted on the collar 18 is a bell crank having a downwardly extending arm 29 and an upwardly extending handle 30. The arm 29 carries a roller adapted to ride on the arm 28. All this mechanism is more specifically shown and described in my Patent No. 1,545,074, dated July 7, 1925, and reference to such patent should be made for details not fully disclosed herein. The operation of the mechanism is hereinafter described.

A tool carriage 31 is mounted on the ways of the bed and carries a formed tool 32 for engaging the head W' of the work blank. The function of the tool is to finish the end faces of the bolt head and to neck the bolt at x. The tool slide 33 is operated by a lever 34 pivoted to the carriage. The upper end of the lever engages the tool slide and the lower end thereof carries a roller 35 adapted to be engaged by a cam 36 on a cam slide 37. A roller 38 on the cam slide is engaged by a cam strip 39 on a drum 40 mounted on the driving shaft 17.

Figure 2:
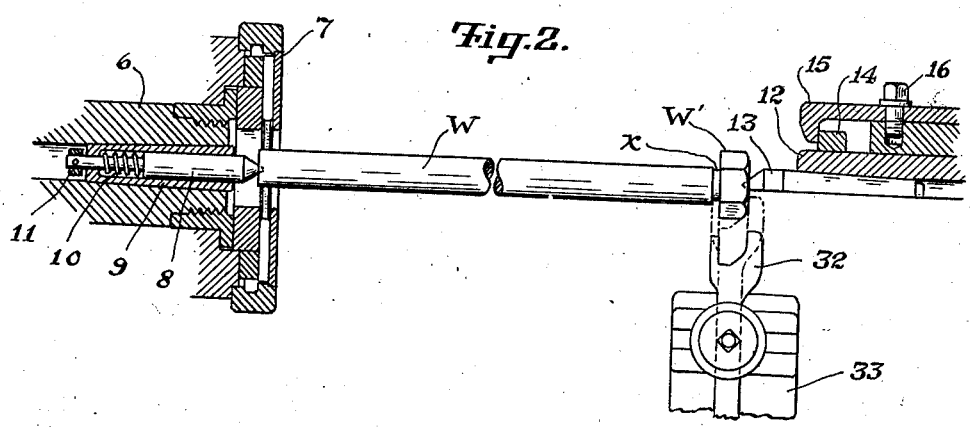
Fig. 2 is an enlarged fragmentary plan view of certain parts thereof.

The mechanism is initially adjusted as follows: A blank W is placed between the centers 8 and 13 and the collar 14 is so adjusted on the spindle 12 that when the same engages the stop 15, the spring 10 will be slightly compressed. The tool carriage is then adjusted on the bed to a position placing the tool in operative alignment with the head of the blank, as illustrated in Fig. 2.

The operation of the mechanism is as follows: Rotation of the shaft 17 withdraws the spindle 12 and a blank W is placed between the centers, preferably from a magazine 41. Continued rotation of the shaft moves the lever 24 in the opposite direction and slides the tailstock spindle forwardly. The work piece is thus engaged by the two centers and the spring 10 is compressed. Forward movement of the spindle 12 is limited by the stop 15. The collar 18 thereafter slips on the spindle and rides the roller of arm 29 upon the arm 28. This operation rocks the bolt 27 against the plate 26 and binds the spindle against movement. The blank head W' is now positioned directly in operative alignment with the tool and the spindle is securely clamped for the tooling operation. Continued rotation of the shaft 17 moves the cam slide 37 whereupon the cam 36 engages the roller 35 and moves the tool into engagement with the work. The work is driven from the spindle 6 by means of the driver 7 and the head of the blank is turned to the shape of the tool, as illustrated in Fig. 2. After the tooling operation, the continued rotation of the shaft 17 releases the centers from engagement with the blank and another blank is received therebetween.

It should be understood that the bolt shanks W of different blanks vary quite considerably in length. Such variation however is compensated for by the spring 10, the tool carriage being so adjusted relative to the stop 15 that the head W' is always located directly in operative alignment with the tool. Were the headstock center fixed and the tailstock center variable (as is the usual construction), the position of the blank head would vary in accordance with the length of the blank shank and therefore vary the position of the head W' relative to the tool.

What I claim is:

1. In a lathe, the combination of a headstock, a spindle rotatably mounted therein, a spring pressed work receiving center in the spindle, a tailstock, a spindle slidably mounted therein, a work receiving center in the spindle, forward movement of the tailstock spindle being adapted to engage a piece of work between the two centers and to compress the said spring, a tool support adjacent the tailstock spindle, a stop for limiting the forward movement of the tailstock spindle whereby to definitely locate the work axially relative to the tool, means for clamping the tailstock spindle in its work engaging position, means for rotating the work from the headstock spindle, and means for moving the support to engage the tool with the tailstock end of the work.

2. In a lathe, the combination of a headstock, a spindle rotatably mounted therein, a spring pressed work receiving center in the spindle, a work driver on the spindle for rotating the work, a tailstock, a spindle slidably mounted therein, a work receiving center in the spindle, means for sliding the spindle, a stop for limiting the forward movement of the tailstock spindle, forward movement thereof being adapted to engage a piece of work between the two centers and to compress the said spring, means for clamping the tailstock spindle in its work engaging position, a tool support adjacent the tailstock spindle, and means for moving the tool support to engage the tool with the tailstock end of the work, whereby the work is located in a definite position axially in front of the tool.

3. In a lathe, the combination of a headstock, a spindle rotatably mounted therein, a spring pressed work receiving center in the spindle, a work driver on the spindle for rotating the work, a tailstock, a spindle slidably mounted therein, a work receiving center in the spindle, means for sliding the tailstock spindle axially in opposite directions, a stop for limiting the forward movement thereof to determine the axial position of the work, forward movement of the tailstock spindle being adapted to engage a piece of work between the two centers and to compress the said spring, and means for automatically binding the spindle against movement after the same has engaged the stop.

4. In a lathe, the combination of a headstock, a spindle rotatably mounted therein, a spring pressed work receiving center in the spindle, a work driver on the spindle for rotating the work, a tailstock, a spindle slidably mounted therein, a work receiving center in the spindle, means for automatically sliding the tailstock spindle axially in opposite directions, stop means for limiting the forward and rearward movements of the tailstock spindle to determine the axial position of the work, forward movement thereof being adapted to engage a piece of work between the two centers and to compress the said spring, and means operated by the first said means for automatically binding the spindle against movement after the same has engaged the forward stop.

5. In a lathe, the combination of a headstock, a spindle rotatably mounted therein, a spring pressed work receiving center in the spindle, a work driver on the spindle for rotating the work, a tailstock, a spindle slidably mounted therein, a work receiving center in the spindle, a tool support adjacent the tailstock spindle, a power shaft for moving the tool support to engage the tool with the tailstock end of the work, means driven from the shaft for automatically sliding the tailstock spindle axially in opposite directions, stop means for limiting the forward and rearward movements thereof, forward movement of the tailstock spindle being adapted to engage a piece of work between two centers and to compress the said spring, and means also driven from the shaft for automatically binding the spindle against movement after the same has engaged the forward stop, whereby the work is located in a definite position axially in front of the tool.

In testimony whereof, I hereto affix my signature.

JOHN J. THACHER.